US007859742B1

(12) United States Patent
Chiu et al.

(10) Patent No.: US 7,859,742 B1
(45) Date of Patent: Dec. 28, 2010

(54) FREQUENCY CONVERSION CORRECTION CIRCUIT FOR ELECTROPHORETIC DISPLAYS

(75) Inventors: Wen-Pin Chiu, Taoyuan County (TW); Ping-Yueh Cheng, Taoyuan County (TW); Feng-Shou Lin, Taoyuan County (TW); Craig Lin, San Jose, CA (US); Bryan Chan, San Francisco, CA (US)

(73) Assignee: Sipix Technology, Inc., Taoyuan County (TW)

( * ) Notice: Subject to any disclaimer, the term of this patent is extended or adjusted under 35 U.S.C. 154(b) by 0 days.

(21) Appl. No.: 12/629,663

(22) Filed: Dec. 2, 2009

(51) Int. Cl.
*G02B 26/00* (2006.01)
*G09G 3/34* (2006.01)
*G09G 5/00* (2006.01)

(52) U.S. Cl. ........................ 359/296; 345/107; 345/214

(58) Field of Classification Search ................. 359/296; 345/107, 214; 430/32; 204/600
See application file for complete search history.

(56) References Cited

U.S. PATENT DOCUMENTS

2010/0188395 A1* 7/2010 Uchida et al. ............... 345/214

FOREIGN PATENT DOCUMENTS

TW 200832031 8/2008

* cited by examiner

*Primary Examiner*—William C Choi
(74) *Attorney, Agent, or Firm*—Muncy, Geissler, Olds & Lowe, PLLC

(57) ABSTRACT

A frequency conversion correction circuit for an electrophoretic display (EPD) which has a control circuit to capture pixel signals of a next picture and gets a corresponding update signal from a look up table to be output, and a driving circuit to provide a plurality set of potential difference signals corresponding to a plurality set of electrodes of an EPD panel according to the update signal. The EPD further has an environment detection device and a duty frequency judgment unit. The environment detection device detects the operation environments of the EPD and gets an environment parameter. The duty frequency judgment unit compares the preset signal value sections where the environment parameter is located and generates a duty frequency signal and sends to the driving circuit. The driving circuit changes and outputs the frequency of the potential difference signals in a fixed frame time according to the duty frequency signal.

5 Claims, 2 Drawing Sheets

FREQUENCY CONVERSION CORRECTION CIRCUIT FOR ELECTROPHORETIC DISPLAYS

FIELD OF THE INVENTION

The present invention relates to a frequency conversion correction circuit for an electrophoretic display (EPD) and particularly to a driving method to adjust and control an EPD through a frequency conversion technique when temperature changes to ensure a display condition is accurate.

BACKGROUND OF THE INVENTION

EPD (or called E-paper, E-ink) adopts a display technique different from the conventional displays such as a cathode ray tube (CRT) and liquid crystal display (LCD). An EPD has multiple micro cups in a substrate that contain a colored dielectric solvent and a plurality of charged colored particles suspended in the colored dielectric solvent. There are two electrodes on outer sides of the micro cups. Through the two electrodes, the potential difference at the edges of the micro cups can be changed and the charged colored particles are attracted by magnetic forces and moved to an electrode of an opposite polarity. The movement of the charged colored particles changes the color displayed on the surface of the substrate. References of control principle and methods can be founded in R.O.C. patent publication No. 538263 entitled “Electrophoretic display” and R.O.C. patent publication No. 200832031 entitled “Electronic paper apparatus and manufacturing method thereof”. Basically they adopt the electrophoretic principle and fundamental structure previously discussed by controlling the potential difference to change the color displayed on the surface. The characteristic differences of the EPD technique and CRT and LCD are known in the art, thus are omitted here. A key technique to control EPD effect is controlling the potential difference applied on the substrate electrodes, the greater the potential difference applied the electrodes, the faster the movement of the charged colored particles. Otherwise, the movement speed of the charged colored particles is slower. The movement distance of the charged colored particles in the micro cups can be divided into multiple sections to form a grey level. The time required for driving all the charged colored particles in the micro cups in the substrate to move once is called a frame time. To control the picture change of the EPD, a control circuit is provided to judge the alteration extent of a next picture through an image processing unit, and a driving unit is provided to apply a potential difference on the electrodes. Hence the control circuit, according to the position of the charged colored particles in the micro cups of the previous picture, can determine the moving distance required by the charged colored particles. Then, through a look up table, the pixel position where the potential difference has to be applied can be obtained. Thereby the potential difference is applied on the electrodes to renew the picture.

The accuracy and speed of the movement position of the charged colored particles affect picture quality and renew speed. Given a same potential difference applying on the electrodes, the movement speed of the charged colored particles is affected by the colored dielectric solvent. When temperature alteration extent is greater, the resistance received by the charged colored particles moving in the colored dielectric solvent changes significantly. In general, a higher temperature results in a greater fluidity of the colored dielectric solvent and the charged colored particles move at a faster speed. On the contrary, a lower temperature results in a lower fluidity of the colored dielectric solvent and a slower moving speed of the charged colored particles. But the conventional control circuit usually does not change the driving voltage or applied voltage difference time with temperature alterations during operation, as a result in extreme operation conditions the problem of color variation or display error occurs. While the conventional techniques also try to use multiple look up tables to match different use temperatures, such as searching a look up table A during 10° C.~30° C., and searching another look up table B during −5° C.~9.9° C. and the like. But using more look up tables requires at least two times of memory capacity for the EPD driving circuit to store the look up tables. As a result, more memory is occupied on the crowded circuit board. The additional memory also increases the cost.

Hence there is still room for improvement in terms of providing an adjustment circuit at a lower cost to maintain the picture quality of the EPD at different operation temperatures.

SUMMARY OF THE INVENTION

In view of the conventional EPD has abnormal display problems in extreme environments and a higher cost on the improved techniques, the primary object of the present invention is to provide a control circuit to adjust operation frequency according to operation environments without an additional memory to store look up tables.

The present invention provides a frequency conversion correction circuit for an EPD. The EPD has a control circuit to capture pixel signals of a next picture and get a corresponding update signal from a look up table to be output, and a driving circuit to provide a plurality set of potential difference signals according to the update signal corresponding to a plurality set of electrodes of an EPD panel. The EPD further has an environment detection device and a duty frequency judgment unit. The environment detection device detects the operation environments of the EPD and gets an environment parameter, and the environment parameter can be a temperature value measured in the surrounding of the EPD. The duty frequency judgment unit sets multiple signal value sections. Depending on the signal value section where the environment parameter is located, a duty frequency signal corresponding to the signal value section is generated and sent to the driving circuit. The driving circuit changes and outputs the frequency of the potential difference signals in a fixed frame time according to the duty frequency signal.

As a result, in the condition of the fixed frame time, the frequency of the potential difference signals output from the electrodes of the EPD panel can be changed to correct display errors of the EPD panel in different environments. The structure thus formed does not require an additional memory to store the look up tables and can reduce the cost of the memory.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

The present invention aims to provide a frequency conversion correction circuit for an electrophoretic display (EPD).

Figure 1:
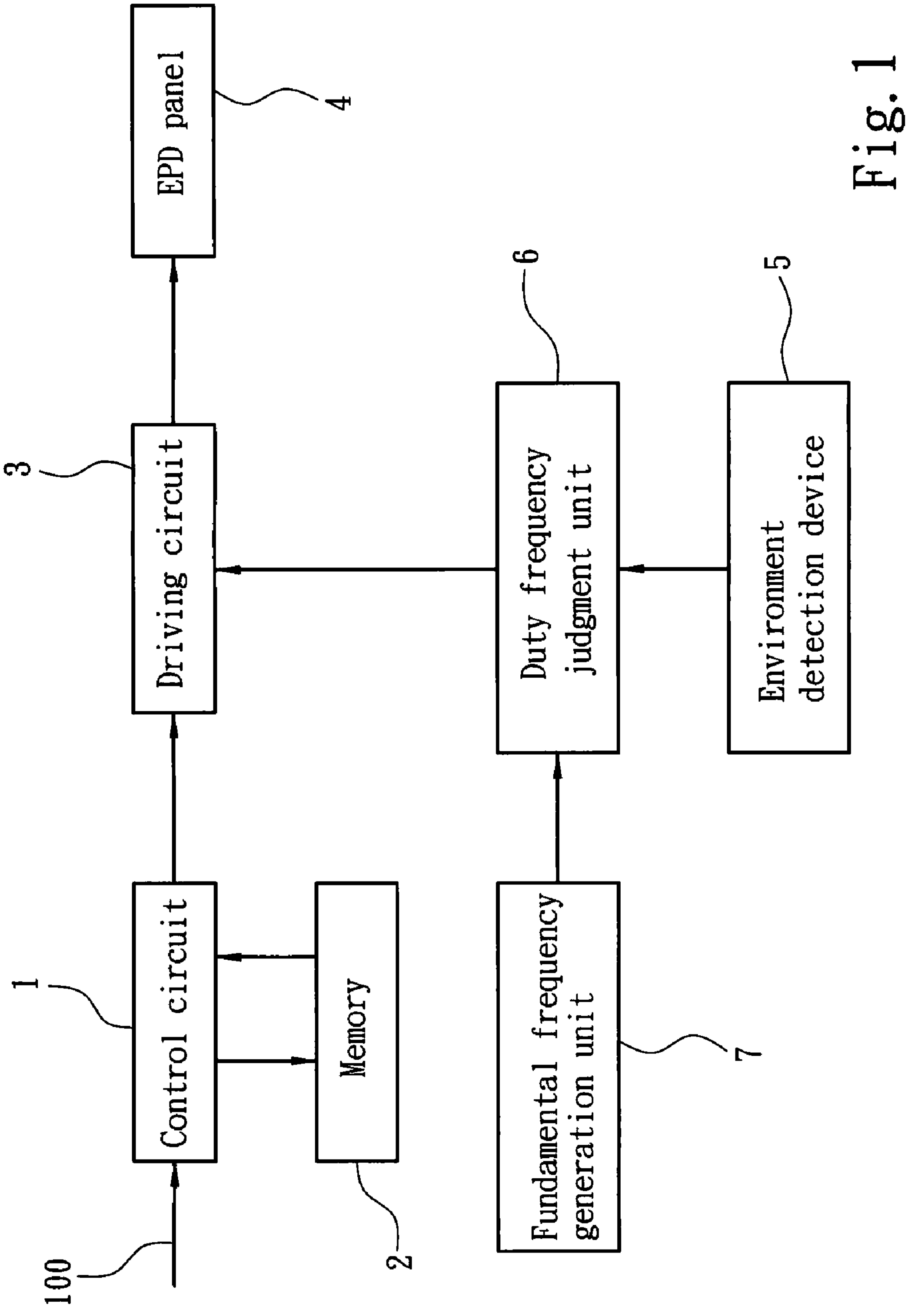
FIG. 1 is a circuit block diagram of the invention.

Please refer to FIG. 1, the EPD has a control circuit 1 to capture pixel signals of a next picture. Next, the control circuit 1 gets a corresponding update signal for comparing a pixel to be updated from a look up table in a memory 2, and the update signal is output to a driving circuit 3. The driving circuit 3 provides a plurality set of potential difference signals corresponding to a plurality set of electrodes (not shown in the drawings) of an EPD panel 4 according to the update signal to drive a plurality of charged colored particles in multiple micro cups on the EPD panel 4 to move to display correct colors. Each elapse time for the driving circuit 4 to output the potential difference signals is a fixed frame time. The time series of the potential difference signals output from the driving circuit 3 are affected by duty frequency. The frequency conversion correction circuit of the EPD includes an environment detection device 5 and a duty frequency judgment unit 6. The environment detection device 5 detects operation environments of the EPD panel 4 and gets an environment parameter. The environment detection device 5 may be a temperature sensor, and the generated environment parameter is a temperature value measured in the surrounding of the EPD. The duty frequency judgment unit 6 sets multiple signal value sections, and generates a duty frequency signal corresponding to the signal value section where the environment parameter is located and sends the duty frequency signal to the driving circuit 3. The driving circuit 3, in the condition of the fixed frame time, changes and outputs the frequency of the potential difference signals according to the duty frequency signal. More specifically, in the condition of the fixed frame time, the output frequency of the potential difference signals in a selected time period is changed (namely alters the frequency of outputting potential difference signals in that time period) to compensate pixel performance in varying operation environments.

In other words, in the condition of fixed frame time, the driving circuit 3 changes the frequency of the potential difference signals output in the same time period according to the duty frequency signal. In general, when the operation environment of the EPD panel 4 is hotter, the charged colored particles in the micro cups move faster, hence the frequency of the potential difference signals output in the same time period from the driving circuit 3 has to be reduced. On the other hand, when the operation environment of the EPD panel 4 is cooler, the charged colored particles in the micro cups move slower, hence the frequency of the potential difference signals output in the same time period from the driving circuit 3 has to be increased. Thus the duty frequency signal provided in the corresponding signal value section according to alterations of the environment parameter changes in inverse proportional to the environment parameter. Thereby, in the same time period, the movement frequency (or times) of the charged colored particles in the micro cups of the EPD panel 4 driven by the potential difference signals changes according to the duty frequency signal. As a result, in a cooler operation environment, the charged colored particles are driven by the potential difference signals and move more frequently. On the other hand, in a hotter operation environment, the charged colored particles are driven by the potential difference signals and move less frequently. For instance, assumed the duty frequency judgment unit 6 sets the signal value sections in section A for −10° C.~10° C., section B for 11° C.~30° C. and section C for 31° C.~45° C.; in the event that the temperature of the operation environment of the EPD panel 4 is 5° C., the duty frequency judgment unit 6 judges that the environment parameter is located in the section A and generates a duty frequency signal A (at a higher frequency) corresponding to the signal value section A and sends to the driving circuit 3, so that the charged colored particles are driven by the potential difference signals and move more frequently to compensate the error of slower movement of the charged colored particles at the lower temperature. Similarly, in the event that the temperature of the operation environment of the EPD panel 4 is 38° C., the duty frequency judgment unit 6 generates another corresponding duty frequency signal C to compensate the error of faster movement of the charged colored particles at the higher temperature. Ideally, with more signal value sections set by the duty frequency judgment unit 6, finer division of the duty frequency signal can be accomplished and alterations are closer to a continuous fashion. However, the invention does not limit the number of the signal value sections. It can be altered and set by designers according to customer requirements.

Figure 2:
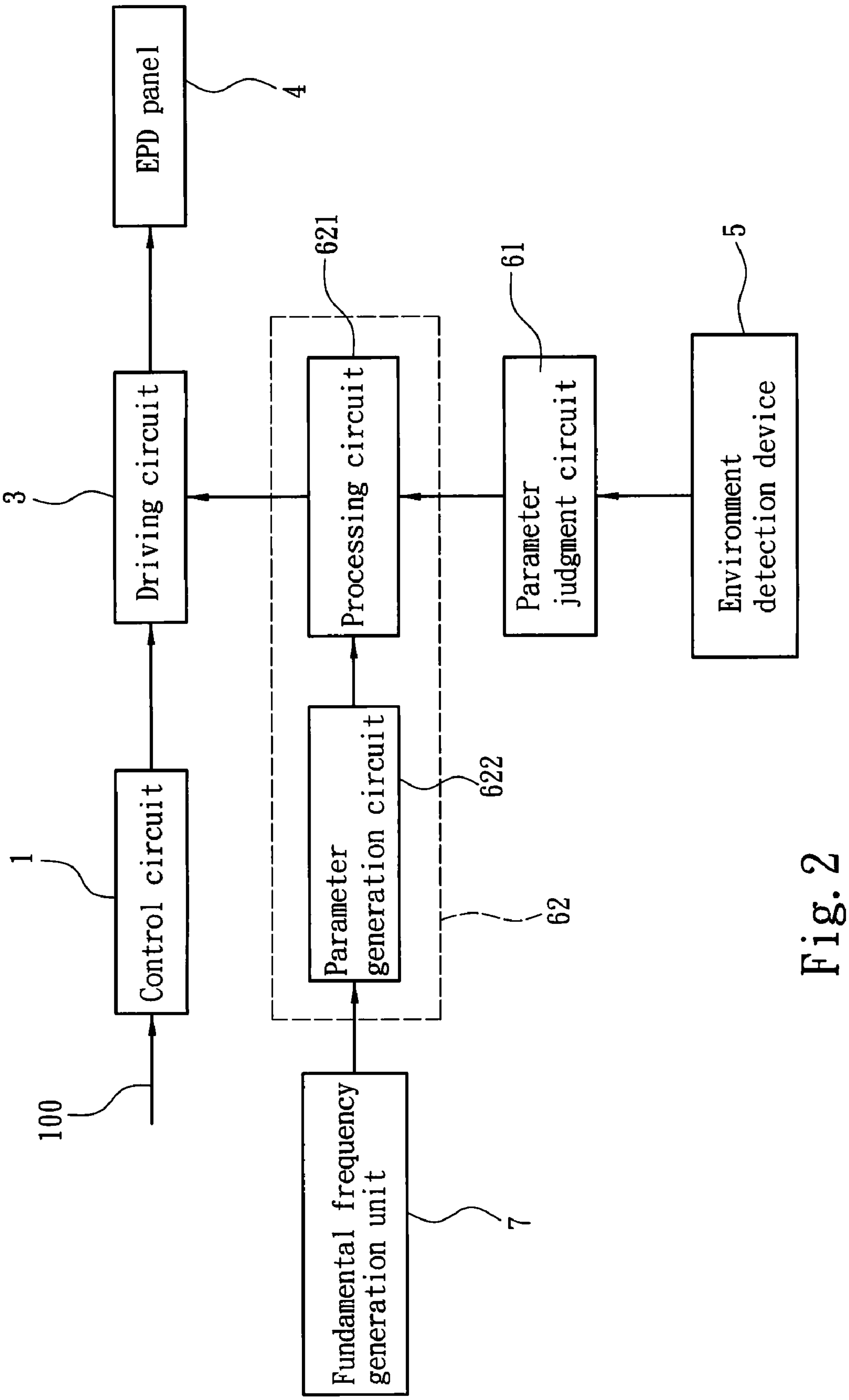
FIG. 2 is a structural block diagram of the duty frequency judgment unit of the invention.

Please refer to FIG. 2 for an embodiment of the duty frequency judgment unit 6. It includes a parameter judgment circuit 61 to set multiple signal value sections and a frequency division circuit 62. The parameter judgment circuit 61 judges the signal value section where the environment parameter is located and provides a corresponding frequency division parameter selection signal. The frequency division circuit 62 gets a fundamental frequency from a fundamental frequency generation circuit 7. The frequency division circuit 62 processes the fundamental frequency according to the frequency division parameter selection signal to generate the duty frequency signal. The frequency division circuit 62 further has a parameter generation circuit 622 containing multiple preset frequency division parameters and a processing circuit 621. The processing circuit 621 gets the fundamental frequency and frequency division parameters through the parameter generation circuit 622, and determines one of the frequency division parameters according to the frequency division parameter selection signal to process with the fundamental frequency to generate the duty frequency signal.

The circuitry structure previously discussed can correct the EPD in different operation environments to improve picture quality without being impacted by the temperature. It provides a significant improvement over the conventional techniques.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A frequency conversion correction circuit for an electrophoretic display (EPD) which has a control circuit to capture pixel signals of a next picture and gets a corresponding update signal from a look up table to be output, and a driving circuit to provide a plurality set of potential difference signals corresponding to a plurality set of electrodes of an EPD panel according to the update signal, the frequency conversion correction circuit comprising:

an environment detection device to detect operation environments of the EPD panel and get an environment parameter; and a duty frequency judgment unit to set multiple signal value sections and generate a duty frequency signal according to a signal value section where the environment parameter is located, and the duty frequency signal being sent to the driving circuit, the driving circuit changing and sending the frequency of the potential difference signals in a fixed frame time according to the duty frequency signal to compensate pixel performance in varying operation environments.

2. The frequency conversion correction circuit of claim 1, wherein the environment detection device is a temperature sensor to generate the environment parameter in temperature values.

3. The frequency conversion correction circuit of claim 1, wherein the duty frequency signal corresponding to the signal value section according to alteration of the environment parameter changes in inverse proportional to the environment parameter.

4. The frequency conversion correction circuit of claim 1, wherein the duty frequency judgment unit includes a parameter judgment circuit to set the multiple signal value sections and a frequency division circuit, the parameter judgment circuit judging the signal value section where the environment parameter is located and providing a corresponding frequency division parameter selection signal, the frequency division circuit getting a fundamental frequency from a fundamental frequency generation circuit and processing the fundamental frequency according to the frequency division parameter selection signal to generate the duty frequency signal.

5. The frequency conversion correction circuit of claim 4, wherein the frequency division circuit includes a parameter generation circuit containing multiple preset frequency division parameters and a processing circuit, the processing circuit gets the fundamental frequency and frequency division parameters through the parameter generation circuit and determining one of the frequency division parameters according to the frequency division parameter selection signal to process with the fundamental frequency to generate the duty frequency signal.

* * * * *